United States Patent
Wang et al.

(10) Patent No.: US 11,073,639 B2
(45) Date of Patent: Jul. 27, 2021

(54) INFRARED CUT-OFF FILTER AND PREPARATION METHOD THEREOF

(71) Applicant: XINYANG SUNNY OPTICS CO., LTD., Henan (CN)

(72) Inventors: Lei Wang, Henan (CN); Weihong Ding, Henan (CN); Rui Du, Henan (CN)

(73) Assignee: XINYANG SUNNY OPTICS CO., LTD., Xinyang (CN)

( * ) Notice: Subject to any disclaimer, the term of this patent is extended or adjusted under 35 U.S.C. 154(b) by 7 days.

(21) Appl. No.: 16/081,343

(22) PCT Filed: Dec. 15, 2017

(86) PCT No.: PCT/CN2017/116530
§ 371 (c)(1),
(2) Date: Aug. 30, 2018

(87) PCT Pub. No.: WO2018/121290
PCT Pub. Date: Jul. 5, 2018

(65) Prior Publication Data
US 2019/0317249 A1    Oct. 17, 2019

(30) Foreign Application Priority Data

Dec. 26, 2016   (CN) .................. 201611221522.X

(51) Int. Cl.
*G02B 5/22*   (2006.01)
*G02B 1/115*  (2015.01)
(Continued)

(52) U.S. Cl.
CPC .............. *G02B 1/115* (2013.01); *G02B 5/208* (2013.01); *G03B 11/00* (2013.01)

(58) Field of Classification Search
CPC .......... G02B 1/10; G02B 1/115; G02B 5/003; G02B 5/208; G02B 5/22; G02B 5/223; G02B 5/20; G02B 1/11; G03B 11/00
See application file for complete search history.

(56) References Cited

U.S. PATENT DOCUMENTS

| | | | |
|---|---|---|---|
| 2008/0207918 A1* | 8/2008 | Aoyama | C09B 57/007 548/455 |
| 2010/0210772 A1* | 8/2010 | Hiwatashi | C09J 133/08 524/407 |

(Continued)

FOREIGN PATENT DOCUMENTS

| | | |
|---|---|---|
| CN | 105074513 | 11/2015 |
| CN | 105911625 | 8/2016 |

(Continued)

OTHER PUBLICATIONS

Examiner provided machine translation of Hong et al. (CN 105911625 A, of record) (Year: 2016).*

(Continued)

*Primary Examiner* — Balram T Parbadia
(74) *Attorney, Agent, or Firm* — Dragon Sun Law Firm, PC; Jinggao Li, Esq.

(57) ABSTRACT

The application relates to an infrared cut-off filter, which includes: a substrate composed of white glass and an infrared cut-off film layer plated on one surface of the white glass; a spin-coated layer plated on the other surface of the white glass; and a reflection-reducing film layer plated on the spin-coated layer; the spin-coated layer includes a bottom layer and an absorbing layer each composed of an organic substance. The infrared cut-off filter has a stable structure, a high degree of firmness between layers, and a low cost.

16 Claims, 2 Drawing Sheets

(51) Int. Cl.
*G02B 5/20* (2006.01)
*G03B 11/00* (2021.01)

(56) References Cited

U.S. PATENT DOCUMENTS

| | | | |
|---|---|---|---|
| 2013/0120823 A1* | 5/2013 | Pei | G02F 1/157 |
| | | | 359/275 |
| 2014/0091419 A1* | 4/2014 | Hasegawa | G02B 5/282 |
| | | | 257/432 |
| 2016/0139308 A1* | 5/2016 | Kim | H01L 27/14625 |
| | | | 348/342 |
| 2016/0327865 A1* | 11/2016 | Kashiwagi | G03F 7/0392 |
| 2018/0003872 A1* | 1/2018 | Kubo | B05D 1/005 |

FOREIGN PATENT DOCUMENTS

| | | |
|---|---|---|
| CN | 106772746 | 5/2017 |
| CN | 206339678 | 7/2017 |

OTHER PUBLICATIONS

International Search Report for PCT/CN2017/116530, dated Mar. 14, 2018.

* cited by examiner

INFRARED CUT-OFF FILTER AND PREPARATION METHOD THEREOF

CROSS-REFERENCE TO RELATED APPLICATIONS

This application is a Submission Under 35 U.S.C. § 371 for U.S. National Stage Patent Application of International Application Number PCT/CN2017/116530, filed Dec. 15, 2017, and entitled INFRARED CUT-OFF FILTER AND PREPARATION METHOD THEREOF, which is related to and claims priority to Chinese Patent Application Serial Number 201611221522.X, filed Dec. 26, 2016, the entirety of both are incorporated herein by reference.

BACKGROUND OF THE INVENTION

Field of the Invention

The application relates to an infrared cut-off filter and a preparation method thereof.

Description of the Related Art

Chinese Patent No. 201610305348.0 discloses a hybrid absorption type infrared cut-off filter and a preparation method thereof. The hybrid absorption type infrared cut-off filter includes a glass substrate, a coated gel layer disposed on an upper surface of the glass substrate, a reflection-reducing film layer disposed above the coated gel layer, and an infrared cut-off film layer disposed on a lower surface of the glass substrate. There is only one layer of coated gel in the filter, and in the plating process, the infrared cut-off film layer and the reflection-reducing film layer are plated after the gel layer is coated. The method of preparing the hybrid absorption type infrared cut-off filter is to ultrasonically clean the glass substrate firstly, then to perform spin coating with a homogenizer, and followed by baking with nitrogen gas. The structure of the filter prepared by this preparation method is unstable, and the degree of firmness between the layers is low. Moreover, baking with nitrogen makes the operation difficult, and the cost is also high.

As an indispensable part in modern people's lives, mobile phone is developing at a fast growing speed. The photographing function of mobile phones plays an important role in daily use, and blue glass is a new type of material used in a camera module of mobile phone. With the development of technology, the thickness of blue glass has become a factor that limits the height of the camera module of mobile phone. As the thickness of the blue glass decreases, the puncture force will drop steeply and cannot meet the requirements of normal use. There is an urgent need for a material that can be made very thin while exhibiting good strength.

BRIEF SUMMARY OF THE INVENTION

An object of the present application to provide an infrared cut-off filter having a stable structure, a high degree of firmness between layers, and a low cost, as well as a method of preparing such an infrared cut-off filter.

To achieve the above object, the present application provides an infrared cut-off filter, which includes: a substrate composed of white glass and an infrared cut-off film layer plated on one surface of the white glass; a spin-coated layer plated on the other surface of the white glass; and a reflection-reducing film layer plated on the spin-coated layer; wherein the spin-coated layer includes a bottom layer and an absorbing layer each composed of an organic substance.

According to an aspect of the application, the infrared cut-off film layer and the reflection-reducing film layer are each formed by alternately plating high refractive index material layer and low refractive index material layer.

According to an aspect of the application, the high refractive index material layer may be composed of one or more of $TiO_2$, $Ti_3O_5$, $Ta_2O_5$ and $H_4$.

According to an aspect of the application, the low refractive index material layer may be composed of one or both of $SiO_2$ and $MgF_2$.

According to an aspect of the application, the number of plated layers of the infrared cut-off film layer is 43-50.

According to an aspect of the application, the infrared cut-off film layer has a plated thickness of 5 μm to 7 μm.

According to an aspect of the application, the number of plated layers of the reflection-reducing film layer is 8-10.

According to an aspect of the application, the reflection-reducing film layer has a plated thickness of 0.4 μm to 0.7 μm.

A method of preparing an infrared cut-off filter includes the steps of:

(a) using an ultrasonic cleaning process to clean white glass;

(b) plating an infrared cut-off film layer on one surface of the white glass;

(c) cleaning the substrate using a plasma cleaning process;

(d) cleaning the substrate using an ultrasonic cleaning process;

(e) plating a spin-coated layer on a surface of the substrate which is not plated with the infrared cut-off film layer; and (f) evaporate plating a reflection-reducing film layer on the spin-coated layer.

According to an aspect of the application, in the step (b), the infrared cut-off film layer is plated by electron gun evaporation and ion source assisted vacuum plating.

According to an aspect of the application, in the step (c), the plasma cleaning process has a power of 300 W-450 W and an action time of 100 s-600 s.

According to an aspect of the application, the step (e) includes the steps of:

(e1) dripping a small amount of binder on the surface of the substrate which is not plated with the infrared cut-off film layer, rotating the substrate at a high speed, uniformly coating the binder on the surface of the substrate by centrifugal force, and simultaneously throwing out excessive binder to form a bottom layer;

(e2) baking the substrate, on which the bottom layer is formed;

(e3) dripping infrared absorbing glue on the bottom layer, rotating at a low speed, uniformly coating the infrared absorbing glue on the bottom layer by centrifugal force, and simultaneously throwing out excessive infrared absorbing glue to form an absorbing layer;

(e4) baking the substrate, on which the absorbing layer is formed; and (e5) using an ultrasonic cleaning process to clean the baked substrate.

According to an aspect of the application, in the step (e1), the rotation speed is 3,000 rpm-5,500 rpm.

According to an aspect of the application, in the step (e2), a dust-free oven is used for baking at a baking temperature of 80° C.-200° C. and a baking time of 2 min-10 min.

According to an aspect of the application, in the step (e3), the rotation speed is 200 rpm-1,000 rpm, and the rotation time is 8 s-15 s.

According to an aspect of the application, in the step (e4), a dust-free oven is used for baking at a baking temperature of 80° C.-200° C. and a baking time of 60 min-120 min.

According to the infrared cut-off filter and the preparation method thereof provided by the application, by pre-plating the infrared cut-off film layer, the production efficiency is improved, and the effect of the higher temperature, at which the infrared cut-off film layer is plated, on the baking effect of the spin-coated layer is avoided, thus ensuing the stability of the spin-coated layer.

According to the infrared cut-off filter and the preparation method thereof provided by the application, the plasma cleaning process is added before the spin-coated layer is applied to the substrate, and the cleanliness of the surface of the infrared cut-off filter is effectively improved.

According to the infrared cut-off filter and the preparation method thereof provided by the application, the spin-coated layer is a combination of the bottom layer and the absorbing layer, and the bottom layer effectively improves the binding degree between the substrate and the absorbing layer, thereby improving the degree of firmness between layers. Moreover, a dust-free oven is used for the spin-coated layer during the baking process, and there is no need to fill the oven with nitrogen, thereby reducing the difficulty of operation and the cost.

According to the infrared cut-off filter and the preparation method thereof provided by the application, the bandwidth of the reflection-reducing film is wider than that of the reflection-reducing film of the conventional blue glass film-coated filter, so that the proportion of the light-passing amount is increased, thereby improving the brightness of photo and improving the imaging quality.

According to the infrared cut-off filter and the preparation method thereof provided by the present application, the central wavelength of the optical characteristic of the infrared cut-off filter is not affected by the thickness of the substrate, and the central wavelengths of substrates having different thicknesses become consistent by the spin coating liquid and by controlling the rotation speed of spin coating or other process conditions, whereas the central wavelength of the blue glass film-coated filter is affected by the material and thickness of the substrate. At the same time, the intensity of the infrared cut-off filter after plating the film layer is higher than that of the blue glass film-coated filter.

The infrared cut-off filter and the preparation method thereof provided by the application can meet the requirements of both day-use and night-use, and solve the inconvenience of alternate use of a day-use lens and a night-use lens, thereby simplifying the device structure.

According to the infrared cut-off filter and the preparation method thereof provided by the present application, the infrared cut-off filter has a small color cast effect in a variation range of an incident angle of 0-30°, and can prevent color inconsistency at the edge and the center of the photo, thereby making the imaging color real.

According to the infrared cut-off filter and the preparation method thereof provided by the present application, the function of absorbing red light and near-infrared light, which is the same as that of the blue glass, is achieved by coating the surface of the white glass with the absorbing layer. At the same time, the infrared cut-off filter has a smaller change of half wavelength when the light is incident at a large angle, thus effectively improving ghosting, stray light and color cast during imaging. Moreover, the substrate has advantages in terms of strength and thickness, and the thinnest thickness can reach 0.11 mm, thus further shortening the height of the camera module.

DETAILED DESCRIPTION OF THE INVENTION

In order to more clearly illustrate the embodiments of the present application or the technical solutions in the prior art, the drawings to be used in the embodiments will be briefly described below. Obviously, the drawings in the following description show only some of the embodiments of the present application, and those skilled in the art can obtain other drawings based on these drawings without creative efforts.

When describing the embodiments of the present application, the orientations or positional relationships described the terms "longitudinal", "transverse", "upper", "lower", "front", "back", "left", "right", "vertical", "horizontal", "top", "bottom", "inner" and "outer" are based on the orientations or positional relationships shown in the related drawings. These terms are merely used for the convenience of describing the present application and simplifying the description, and do not indicate or imply that the device or element referred to must have a particular orientation, or must be constructed or operated in a particular orientation. Therefore, the above terms are not to be construed as limiting the scope of the application.

The present application will be described in detail below with reference to the drawings and specific embodiments. It is impossible to describe all the embodiments exhaustively herein, but the embodiments of the present application are not limited to the following embodiments.

Figure 1:
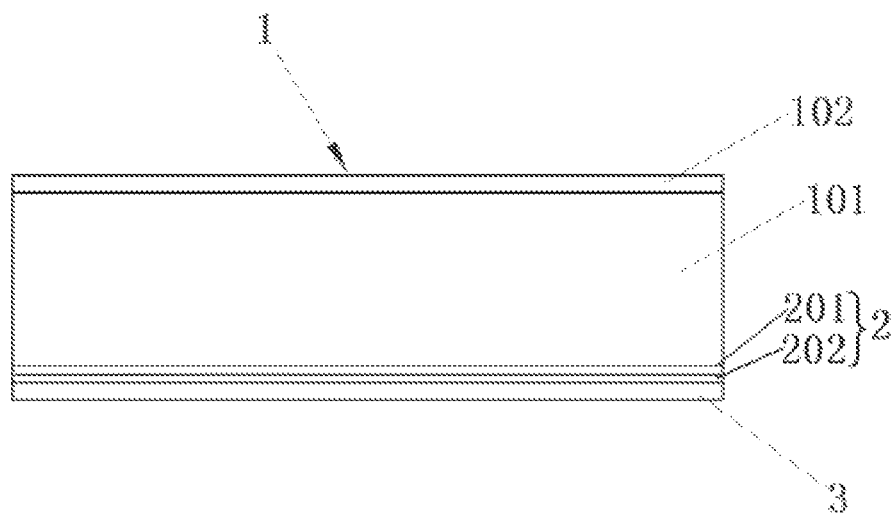
FIG. 1 is a schematic view showing the structure of an infrared cut-off filter according to the present application.

FIG. 1 is a schematic view showing the structure of an infrared cut-off filter according to an embodiment of the present application. As shown, according to an embodiment of the present application, the infrared cut-off filter includes a substrate 1, a spin-coated layer 2 and a reflection-reducing film layer 3. As shown in the figure, in the present embodiment, the substrate 1 includes white glass 101 and an infrared cut-off film layer 102 coated on one surface of the white glass 101, the spin-coated layer 2 is plated on the other surface of the white glass 101, and the reflection-reducing film layer 3 is plated on the spin-coated layer 2.

According to an embodiment of the present application, the infrared cut-off film layer 102 is formed by alternately plating high refractive index material layer and low refractive index material layer. In the present embodiment, the high refractive index material layer may be composed of one or more of $TiO_2$, $Ti_3O_5$, $Ta_2O_5$ and $H_4$. The low refractive index material layer may be composed of one or both of $SiO_2$ and $MgF_2$. The number of plated layers of the infrared cut-off film layer 102 is 43-50, and the infrared cut-off film layer 102 has a plated thickness of 5 μm to 7 μm.

According to an embodiment of the application, the spin-coated layer 2 includes a bottom layer 201 and an absorbing layer 202. In the present embodiment, the bottom layer 201 and the absorbing layer 202 each is composed of an organic substance. The bottom layer 201 is coated on a surface of the white glass 101 that is opposite to the plated infrared cut-off film layer 102, and the absorbing layer 202 is plated on the bottom layer 201, that is, the bottom layer 201 is located between the substrate 1 and the absorbing layer 202. The bottom layer 201 increases the binding degree of the absorbing layer 202 and the white glass 101, so that the absorbing layer 202 is more firmly adhered to the white glass 101, thereby improving the firmness of the entire spin coated layer. At the same time, the absorbing layer 202 allows the substrate 1 to have a function of absorbing red light and near-infrared light.

In an embodiment in accordance with the present application, the reflection-reducing film layer 3 is formed by alternately plating a layer of high refractive index material and a layer of low refractive index material. In the present embodiment, the layer of high refractive index material layer may be composed of one or more of $TiO_2$, $Ti_3O_5$, $Ta_2O_5$ and $H_4$. The layer of low refractive index material layer may be composed of one or both of $SiO_2$ and $MgF_2$. The number of plated layers of the reflection-reducing film layer 3 is 8-10, and the reflection-reducing film layer 3 has a plated thickness of 0.4 μm to 0.7 μm.

Figure 2:
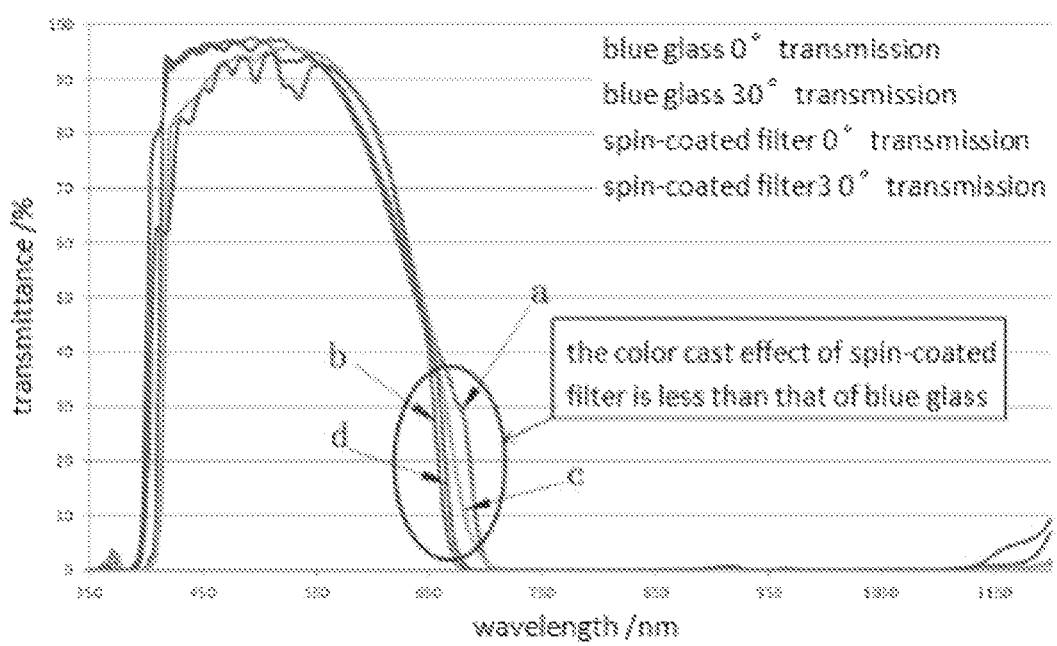
FIG. 2 is a view schematically showing a comparison between characteristic curves of an infrared cut-off filter according to the present application and a blue glass film-coated filter.

FIG. 2 is a view schematically showing a comparison between characteristic curves of the infrared cut-off filter according to the present application and a blue glass film-coated filter. In the figure, the horizontal axis represents the spectral band, and the vertical axis represents the transmittance. The filter has a color cast effect in a variation range of large angle. The larger the color cast effect is, the less real the image color will be. As shown in the figure, curve a is the characteristic curve of the incident angle of 0° of the blue glass film-coated filter, curve b is the characteristic curve of the incident angle of 30° of the blue glass film-coated filter, curve c is the characteristic curve of the incident angle of 0° of the infrared cut-off filter, and curve d is the characteristic curve of the incident angle of 30° of the infrared cut-off filter. In the variation range of the incident angle of 0°-30°, when the wavelength changes, a larger difference between the characteristic curves indicates that the color cast effect is more obvious. At the marked positions in the figure, the difference between the curve a and the curve b is significantly larger than the difference between the curve c and the curve d, that is, when the light is incident at an angle of 0°-30°, the variation amount of the wavelength of the blue glass film-coated filter is larger than that of the infrared cut-off filter. The coincidence degree of the two characteristic curves of the blue glass film-coated filter at the incident angles of 0°-30° is smaller than that of the infrared cut-off filter of the present application. Therefore, it can be seen that the infrared cut-off filter according to an embodiment of the present application has a smaller color cast effect than the blue glass film-coated filter, and can well improve the phenomenon that the color cast effect of the wide-angle lens becomes more obvious as the angle increases. At the same time, it saves production costs.

Figure 3:
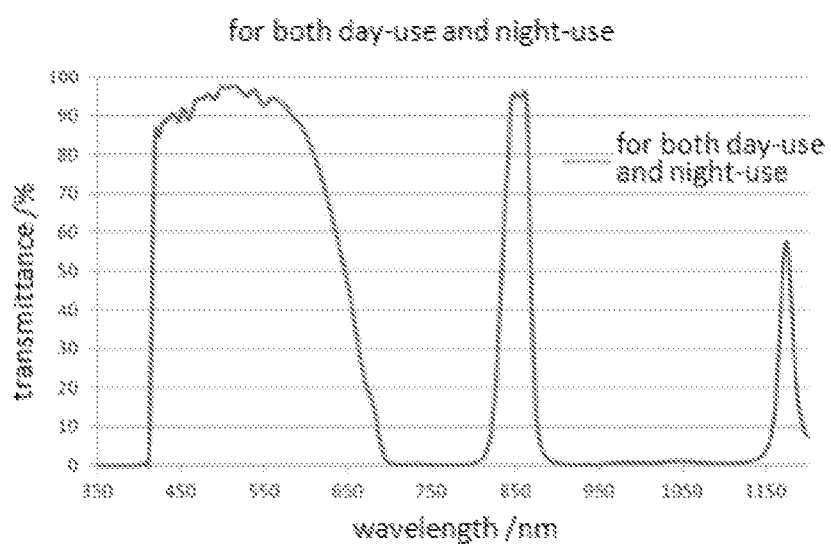
FIG. 3 is a graph showing the characteristic curve of the infrared cut-off filter for both day-use and night-use according to the present application.

FIG. 3 is a graph showing the characteristic curve of the infrared cut-off filter for both day-use and night-use according to the present application. In the figure, the horizontal axis represents the spectral band, and the vertical axis represents the transmittance. In existing optical devices for both day-use and night-use, a day-use lens and a night-use lens are alternately employed to achieve the effect of both day-use and night-use. As shown in FIG. 3, the infrared cut-off filter according to an embodiment of the present application has characteristics of front and rear bands. It can be seen from the figure that in the transmission band between 420 nm-560 nm in the front band, the minimum transmittance is not less than 78%, and the average transmittance is above 91%. When the central wavelength is 650±10 nm at a transmittance of 50%, the incident angle of 0°-30° has a half-wave value offset of less than 5 nm, and in the cut-off band between 700 nm-790 nm, the average maximum transmittance is less than 5%, which is suitable for day-use; in the transmission band between 850±10 nm in the rear band, the average minimum transmittance is above 80%, and in the cut-off band of 910 nm-1100 nm, the average maximum transmittance is below 5%, which is suitable for night-use. The application effectively solves the inconvenience of using two lenses alternately, and the lens using the infrared cut-off filter of the application can simultaneously meet the requirements of both day-use and night-use, which simplifies the structure of the device.

According to the present application, a method of preparing the above filter is also provided, which includes the steps of:

(a) Using an ultrasonic cleaning process to clean the white glass 101. In this step, the dirt and organic materials or the like on the surface of the white glass 101 on which a film layer will be plated are washed away, and a good cleanness of the surface of the white glass 101 is ensured, which is advantageous for improving the quality of the plated film layer;

(b) Plating an infrared cut-off film layer 102 on one surface of the white glass 101. According to an embodiment of the present application, when plating the infrared cut-off film layer 102 on the white glass 101, a designed film layer is deposited by electron gun evaporation and ion source assisted vacuum plating. In the present embodiment, the number of plated layers of the infrared cut-off film layer 102 is 43-50, and the thickness of film layer is 5 μm-7 μm. By using such a method of pre-plating the infrared cut-off film layer 102, the production efficiency is effectively improved. Moreover, the temperature required for plating the infrared cut-off film layer 102 is higher than the temperature required for the spin coated layer 2, thereby avoiding the influence of high temperature on the stability of the spin coated layer 2 in the subsequent processing.

(c) Cleaning a substrate 1 using a plasma cleaning process. According to an embodiment of the present application, the white glass 101 which is plated with the infrared cut-off film layer 102 in the step (b) has to go through a plasma cleaning process. In the present embodiment, the plasma cleaning process has a power of 300 W-450 W and an action time of 100 s-600 s. The surface cleanness of the substrate 1 can be improved by the plasma cleaning process.

(d) Cleaning the substrate 1 using an ultrasonic cleaning process. After the plasma cleaning, it is also necessary to obtain a substrate 1 having a better surface cleanness by ultrasonic cleaning.

(e) Plating a spin-coated layer 2 on a surface of the substrate 1 which is not plated with the infrared cut-off film layer 102. According to an embodiment of the present application, the qualified substrate 1 obtained through the above steps has to be plated with the spin-coated layer 2. In the present embodiment, the following steps has to be executed so that the spin-coated layer 2 is plated:

(e1) Dripping a small amount of binder on a surface of the substrate 1 which is not plated with the infrared cut-off film layer 102, rotating the substrate 1 at a high speed, uniformly coating the binder on the surface of the substrate 1 by centrifugal force, and simultaneously throwing out excessive binder to form a bottom layer 201. In the present embodiment, the rotation speed is 3,000 rpm-5,500 rpm so that the binder can be uniformly coated on the substrate 1, and it is ensued that the bottom layer 201 having a uniform thickness can be formed.

(e2) Baking the substrate 1, on which the bottom layer 201 is formed. According to an embodiment of the present application, drying treatment is required after the bottom layer 201 is coated. In the present embodiment, the substrate 1 coated with the bottom layer 201 is placed in a dust-free oven for baking at a baking temperature of 80° C.-200° C. and a baking time of 2 min-10 min. In this way, a better curing effect is achieved for the coated bottom layer 101. In the baking process, the dust-free oven does not need to be filled with nitrogen, which reduces the work difficulty and cost.

(e3) Dripping infrared absorbing glue on the bottom layer 201, rotating at a low speed, uniformly coating the infrared absorbing glue on the baked bottom layer 201 by centrifugal force, and simultaneously throwing out excessive infrared absorbing glue to form an absorbing layer 202. In the present embodiment, the rotation speed is 200 rpm-1,000 rpm, and the rotation time is 8 s-15 s, so that the infrared absorbing glue can be uniformly coated on the substrate 1, and it is ensured that the absorbing layer 202 having a uniform thickness can be formed.

(e4) Baking the substrate 1, on which the absorbing layer 202 is formed. According to an embodiment of the application, the coated absorbent layer 202 requires a drying treatment. In the present embodiment, the baking temperature is 80° C.-200° C., and the baking time is 60 min-120 min. The coated absorbing layer 202 can be stably adhered to the substrate 1.

(e5) Using an ultrasonic cleaning process to clean the baked substrate 1. According to an embodiment of the present application, the substrate 1 coated with the spin-coated layer 2 and baked in the above steps is put into an ultrasonic process to remove impurities or dirt on the surface of the spin-coated layer 2 after baking, so that the surface of the spin-coated layer 2 has a good cleanness.

(f) Evaporate plating a reflection-reducing film layer 3 on the spin-coated layer 2. According to an embodiment of the present application, after the substrate 1 is coated with the spin-coated layer 2 in the above steps and after the appearance of the substrate 1 is ensued to be qualified, a step of plating the reflection-reducing layer 3 is carried out. The reflection-reducing film layer 3 is vapor-evaporated on the absorbing layer 202 in the spin-coated layer 2. In the present embodiment, the number of plated layers of the reflection-reducing film layer 3 is 8 to 10, and the thickness thereof is 0.4 μm to 0.7 μm. The reflection-reducing film layer 3 can be plated at a low temperature, which effectively protects the stability of the spin-coated layer 2. Moreover, in the present embodiment, the bandwidth of the reflection-reducing film is wider than that of the reflection-reducing film of the conventional blue glass film-coated filter. Since the bandwidth is widened, the proportion of the light-passing amount is increased, thereby improving the brightness of photo and improving the imaging quality.

By using the infrared cut-off filter obtained by the preparation method of the present application, the absorbing film 202 can be coated on the substrates 1 having different thicknesses, and the same central wavelength can be realized by controlling the process parameters such as the rotation speed and the like. The infrared cut-off filter prepared according to the application avoids the disadvantage that the different thickness of the blue glass in the blue glass film-coated filter determines the different central wavelength, thereby reducing the requirement on the thickness of the substrate, effectively reducing the difficulty in production, and saving the production cost accordingly.

According to the infrared cut-off filter obtained by the production method of the present application, white glass of 0.11 mm, 0.21 mm, 0.3 mm, and 0.55 mm can be used. The thickness of the existing blue glass is 0.21 mm and 0.3 mm, there is no good way to address the difficulty in making the blue glass very thin (for example, 0.11 mm) in mass production. At the same time, the intensity of the blue glass decreases steeply with the decrease of the thickness, and the infrared cut-off filter produced by the preparation method avoids this disadvantage of the blue glass. In order to highlight the advantages of the infrared cut-off filter produced by the preparation method, the infrared cut-off filter prepared using a 0.11 mm white glass by the present preparation method and a 0.21 mm CXA series blue glass film-coated filter are comparatively measured in terms of the puncture force of, as shown in table 1 (unit: kgf):

TABLE 1

0.11 mm spin-coated film finished product
size of cut pieces 6.25*5.25*0.11
puncture force

| AR | 2.75 | 2.66 | 2.115 | 3.07 | 3.19 | average |
|----|------|------|-------|------|------|---------|
|    | 2.1  | 2.885| 2.533 | 2.525| 2.525| 2.64    |
| IR | 2.785| 2.275| 2.215 | 2.365| 2.89 | average |
|    | 2.935| 3.17 | 3.62  | 3.17 | 3.36 | 2.88    |

CXA series blue glass size of cut pieces 6.25*5.25*0.21
puncture force

| AR | 1.76 | 2.505| 1.3   | 2.025| 1.905| average |
|----|------|------|-------|------|------|---------|
|    | 2.395| 2.32 | 1.895 | 1.35 | 1.165| 1.86    |
| IR | 1.07 | 2.95 | 1.042 | 1.074| 1.18 | average |
|    | 1.12 | 1.385| 1.095 | 1.562| 1.23 | 1.37    |

Table 1 is the measurement data showing a comparison between the infrared cut-off filter prepared using a 0.11 mm white glass by the present preparation method and a 0.21 mm CXA series blue glass film-coated filter in terms of the puncture force. Herein, the puncture force refers to the force generated for resisting an external force when the external force is applied. The measurement data is measured by a SUNDOO thrust meter. In table 1, AR refers to the reflection-reducing film layer, and IR refers to the infrared cut-off film layer. It can be seen from table 1 that the average puncture force of the reflection-reducing film layer of the 0.11 mm infrared cut-off filter obtained by the preparation method is 2.64, and the average puncture force of the reflection-reducing film layer of the 0.21 mm CXA series blue glass film-coated filter is 1.86. Therefore, the puncture force of the reflection-reducing film layer of the 0.11 mm infrared cut-off filter is better than the puncture force of the reflection-reducing film layer of the 0.21 mm CXA series blue glass film-coated filter. The average puncture force of the infrared cut-off film layer of the 0.11 mm infrared cut-off filter obtained by the preparation method is 2.88, and the average puncture force of the infrared cut-off film layer of the 0.21 mm CXA series blue glass film-coated filter is 1.37. Therefore, the puncture force of the infrared cut-off film layer of the 0.11 mm infrared cut-off filter is better than the puncture force of the infrared cut-off film layer of the 0.21 mm CXA series blue glass film-coated filter. It can be seen from table 1 that the intensity of the infrared cut-off filter obtained by the present preparation method is superior to that of the blue glass film-coated filter.

The infrared cut-off filter obtained by the preparation method of the present application has characteristic data listed in the form of a table, as shown in table 2.

TABLE 2

| | characteristic requirements of spin coating 640 (or 650) | | | |
|---|---|---|---|---|
| No. | item | | 0° | 30° |
| 1 | 350 nm-395 nm | Tave≤ | 3 | 5 |
| 2 | UV side T = 20%-80% | < | 20 | 30 |
| 3 | UV side T = 50% range of position | min | 405 | 395 |
| | | max | 425 | 415 |
| 4 | 440 nm-560 nm | Tmin | 78 | 76 |
| | | Tave | 91 | 87 |
| 5 | (spin coating 640) IR side T = 50% | min | 635 | 635 |
| | | max | 645 | 645 |
| | | 0°-30° shift≤ | 10 | |
| 5 | (spin coating 650) IR side T = 50% | min | 645 | 645 |
| | | max | 655 | 655 |
| | | 0°-30° shift≤ | 10 | |
| 6 | Coalescent point | T≤ | 40 | 60 |
| 7 | IR side T = 15% Δλ (0°-30°) | ≤ | | 35 |
| 8 | IR T = 80%-45% | ≤ | | 100 |
| 9 | IR T = 15%-10% | ≤ | | 10 |
| 10 | 700 nm-1100 nm | Tavg≤ | | 1 |
| 11 | 750 nm-1100 nm | Tavg≤ | | 0.5 |
| | 750 nm-1100 nm | Tmax≤ | | 3 |
| 12 | 1100 nm-1200 nm | 0°, Tave≤ | 3 | / |

Table 2 shows the characteristic data of the infrared cut-off filter produced by the production method according to the present application. As can be seen from the data in table 2, the infrared cut-off filter prepared according to the preparation method of the present application has data that satisfies the characteristic requirements of the items listed in the table in range of incident angle of 0°-30°.

The above is only an exemplification of the specific embodiments of the present application, and the devices and structures that are not described in detail should be construed as being implemented by the general devices and general methods existing in the art.

The above is only one embodiment of the present application, and is not intended to limit the present application. For those skilled in the art, various modifications and changes can be made to the present application. Any modifications, equivalent substitutions, improvements or the like made within the spirit and scope of the present application are intended to be included in the scope of protection of the present application.

The invention claimed is:

1. An infrared cut-off filter, comprising:
a substrate composed of white glass and an infrared cut-off film layer plated on one surface of the white glass;
a spin-coated layer plated on another surface of the white glass;
and a reflection-reducing film layer plated on the spin-coated layer; wherein the spin-coated layer comprises a bottom layer and an absorbing layer each composed of an organic substance.

2. The infrared cut-off filter according to claim 1, wherein the infrared cut-off film layer and the reflection-reducing film layer are each formed by alternately plating high refractive index material layer and low refractive index material layer.

3. The infrared cut-off filter according to claim 2, wherein the high refractive index material layer may be composed of one or more of $TiO_2$, $Ti_3O_5$, $Ta_2O_5$ and $H_4$.

4. The infrared cut-off filter according to claim 2, wherein the low refractive index material layer may be composed of one or both of $SiO_2$ and $MgF_2$.

5. The infrared cut-off filter according to claim 4, wherein the number of plated layers of the infrared cut-off film layer is 43-50.

6. The infrared cut-off filter according to claim 5, wherein the infrared cut-off film layer has a plated thickness of 5 μm to 7 μm.

7. The infrared cut-off filter according to claim 4, wherein the number of plated layers of the reflection-reducing film layer is 8-10.

8. The infrared cut-off filter according to claim 7, wherein the reflection-reducing film layer has a plated thickness of 0.4 μm to 0.7 μm.

9. A method for preparing an infrared cut-off filter, comprising the steps of:
(a) using an ultrasonic cleaning process to clean white glass;
(b) plating an infrared cut-off film layer on one surface of the white glass to form a substrate;
(c) cleaning the substrate using a plasma cleaning process;
(d) cleaning the substrate using an ultrasonic cleaning process;
(e) plating a spin-coated layer on a surface of the substrate which is not plated with the infrared cut-off film layer; and
(f) evaporate plating a reflection-reducing film layer on the spin-coated layer.

10. The method of preparing the infrared cut-off filter according to claim 9, wherein in the step (b), the infrared cut-off film layer is plated by electron gun evaporation and ion source assisted vacuum plating.

11. The method of preparing the infrared cut-off filter according to claim 9, wherein in the step (c), the plasma cleaning process has a power of 300 W-450 W and an action time of 100 s-600 s.

12. The method of preparing the infrared cut-off filter according to claim 9, wherein the step (e) comprises the steps of:
(e1) dripping a small amount of binder on the surface of the substrate which is not plated with the infrared cut-off film layer, rotating the substrate at a high speed, uniformly coating the binder on the surface of the substrate by centrifugal force, and simultaneously throwing out excessive binder to form a bottom layer;
(e2) baking the substrate, on which the bottom layer is formed;
(e3) dripping infrared absorbing glue on the bottom layer, rotating at a low speed, uniformly coating the infrared absorbing glue on the bottom layer by centrifugal force, and simultaneously throwing out excessive infrared absorbing glue to form an absorbing layer;
(e4) baking the substrate, on which the absorbing layer is formed; and
(e5) using an ultrasonic cleaning process to clean the baked substrate.

13. The method of preparing the infrared cut-off filter according to claim 12, wherein in the step (e1), the rotation speed is 3,000 rpm-5,500 rpm.

14. The method of preparing the infrared cut-off filter according to claim 12, wherein in the step (e2), a dust-free oven is used for baking at a baking temperature of 80° C.-200° C. and a baking time of 2 min-10 min.

15. The method of preparing the infrared cut-off filter according to claim 12, wherein in the step (e3), the rotation speed is 200 rpm-1,000 rpm, and the rotation time is 8 s-15 s.

16. The method of preparing the infrared cut-off filter according to claim 12, wherein in the step (e4), a dust-free oven is used for baking at a baking temperature of 80° C.-200° C. and a baking time of 60 min-120 min.

* * * * *